United States Patent [19]

Schloss

[11] 4,329,881
[45] May 18, 1982

[54] EXTREMELY SENSITIVE FORCE DETECTOR

[76] Inventor: Alden Schloss, P.O. Box 4862, North Hollywood, Calif. 91607

[21] Appl. No.: 123,845

[22] Filed: Feb. 22, 1980

[51] Int. Cl.³ .................... G01L 1/04; G01L 3/00
[52] U.S. Cl. .................... 73/862.08; 73/862.64; 177/210 R
[58] Field of Search ............ 73/382, 383, 517 R, 73/DIG. 11, 862.64, 862.38, 862.08; 177/201, 225, 210 R, DIG. 9

[56] References Cited

U.S. PATENT DOCUMENTS 2,304,191  12/1942  Mott-Smith ............... 73/382
2,367,126   1/1945  James ...................... 73/382
2,574,395  11/1951  Jack et al. ................ 73/382

FOREIGN PATENT DOCUMENTS 341808  8/1904  France .

*Primary Examiner*—Charles A. Ruehl

[57] ABSTRACT

A device having a movable element which floats in a force field. Such placement allowing a minimum of friction. Such element is so placed that it can continuously interrupt and vary an energy field, which variation is then detected as a signal and amplified by appropriate means. Such detection and amplification is then made observable by an appropriate output indicator.

5 Claims, 7 Drawing Figures

EXTREMELY SENSITIVE FORCE DETECTOR

SUMMARY OF THE INVENTION

This invention relates to a form of force detection and measurement. The forces to be measured are extremely small. Attempting merely to amplify the effect of an input force on some movable member will not suffice if that force is less than the static friction associated with such movable member. Therefore, a means must be found to so mount an input movable member that its friction is at an absolute minimum. (The input movable member is defined as that first member to which the force to be measured is applied, hereafter simply called the input member). Ideally, such friction would be zero if the input member were suspended freely in a vacuum (in contact with nothing). There are practical ways to approach such a condition. There are passive and active A.C. magnetic bearings which could provide contactless support. (Such bearings are discussed in the literature.) Use of such bearings would be quite expensive and would not be practical for the purpose here. The present invention uses a form of magnetic bearing that isn't perfectly pure in that there is a contacting mechanical constraint. Such a bearing is almost as friction free as a contactless bearing but bears the advantage of being considerably less expensive and hence much more practical. Such use allows the invention to "price out" in a larger (lower price) market.

The input member is suspended in a force field. Such fields include:

(a) gravitational
(b) D.C. Electrostatic and
(c) Permanent magnetic.

These are "D.C." in nature, that is, they are constant and unidirectional. One authority has shown the theoretical impossibility of using such fields to produce totally free suspension, i.e. one in which the member would completely float free. In such fields one needs at least one stabilizing constraint (some physical contact). A practical example of such an arrangement is a weight suspended by a string attached to a support. Gravitational fields require the constraint that one has only one choice of field direction; vertical. Such constraint would not make for a practical device. Electrostatic fields are not so restrictive; however, unless extremely high voltages (or highly charged electrets) are used, the fields are very weak. Finally, the most practical field is that of a magnet which may emanate from either a permanent magnet or an electromagnet. (Hereafter the word "magnet" will stand for either type.) One may then suspend a light object such as a sewing needle, which has some flexible means attached to it such as thread. The thread in turn is attached to some point on a support frame in such position that the needle point may be brought very close to the magnet but not actually touching it. Depending on the weight of the needle, the length of the thread and the strength of the magnet, the needle will float "free." There is a very small amount of friction encountered if one uses this arrangement, because the thread is made to twist. There is then friction in shear as the thread fibers slide past each other to allow the twisting motion. The longer the thread, the smaller will be this shear motion for a given amount of twist. In the proposed invention, just such an arrangement is used, the needle acting as a shaft to carry a vane for the purpose of casting a shadow on a pair of photocells. This vane is the aforementioned input member. (In this case the input member is merely a vane, it can in other configurations include a weighing pan.) The object is to have the input member vary (modulate) some "non mass" form of energy. In this way the member need not encounter further friction as it varies some electrical quantity which can be amplified and used to work some output indicator such as a D'arsonval movement. Other output indicators can be used, such as a cathode ray tube, a tuning eye tube, ear phones or a loud speaker. All such will be referred to as output indicator. The "energy" referred to can be that of any field that will not measurably interact with (that is, impede) the motion of the input member, but which *can* be varied by the input member. Such fields can be any in the wide spectrum we call electromagnetic. (It will prove highly impractical to attempt to use static electric or permanent magnetic fields for this purpose, for then there can well be interaction). The most practical energy field to use is that of light; however, any region of the electromagnetic spectrum may be used. Photocells are the detectors to be used when light is the medium. A small antenna connected to some non-linear device (a diode) is necessary to detect radio waves and an infrared detector is necessary for detecting infrared rays. The generic "suitable detector" shall be used to mean that detector which is necessary for the particular region chosen. Such detectors provide an electrical signal due to the variation of energy impinging on them; such signal can then be amplified electrically. The generic "energy" shall be used to denote all possible energy fields.

When some force is applied to the input member it rotates and twists the supporting thread. When the torque built up in the thread due to this twisting equals the torque applied to the input member, motion stops. (The torque applied by the input member is equal to the force applied to it, multiplied by the distance of application of the force from the axis of rotation). The input member is placed between the source of energy and the detector. Its motion then changes the amount of energy reaching the detector. In the preferred embodiment, a balanced arrangement is used. A pair of detectors is used and the vane is so placed that at mid point (or rest) it allows light to fall equally on both detectors. Geometry is such that each detector (for rest position) is half in light and half in shadow. Electrically, the outputs of the two detectors (or singly a pair) are in opposition, so that at midpoint the outputs cancel. As the input member rotates, the shadow on one detector of the pair increases and the shadow on the other detector decreases. A net output signal proportional to the amount of motion is then applied to an amplifier. The amplifier output is then applied to a suitable indicator; in the preferred embodiment it is a moving coil movement. The indicator can then display a much amplified movement analagous to that of the input member. Electrical amplification is not absolutely necessary, as some output indicators can be driven directly by some detectors. One example of such makes use of photovoltaic detectors which are capable of providing voltage at a relatively low source impedance. Such could then directly drive a galvanometer type of movement which bears a small mirror. A strong finely focused second light source is made to reflect off the mirror at some angle. At a much larger distance (compared to the distance to the light source) the reflected light is displayed on a screen. Quite large display amplification results without the use of electrical amplification. Another example involves applying the voltage from the photovoltaic cells to the deflection plates of a cathode ray tube. If the electron beam then passes through the center of the electrical equivalent of a very short focal length negative lens, magnification of output indication again results. Therefore, presenting the signal from the detectors to the output indicator either directly or through an actual amplifier shall both be referred to as "connection means."

Such a device is desirable and useful. Configured to accept small masses on the input member and properly calibrated, it is an extremely sensitive weighing scale. Configured so that one may see the input member, the device can be used to demonstrate psychokinetic phenomenon. In this mode, reference to the output indicator by the operator provides bio-feedback which can enhance his ability to perform such function.

A principal object of this invention is to provide a means of measuring extremely small forces such as those provided by extremely small masses in a gravitational field.

A further object of this invention is to detect the very feeble forces generated in psychokinetic phenomenon.

A further object of this invention is to develop and enhance by bio-feedback the psychokinetic ability believed to be inherent in all people.

The foregoing and other objects are realized in a device having an input member suitably contained in a low friction environment. The input member is positioned so that it casts a shadow on a suitable pair of detectors. The shadow cast is due to interruption (by the input member) of an energy field. An amplifier may be provided to amplify the signal from the detector and to drive an output indicator.

A better understanding can be had from the following description and the accompanying drawings. (Obvious fastening devices have been omitted for clarity.)

Figure 1:
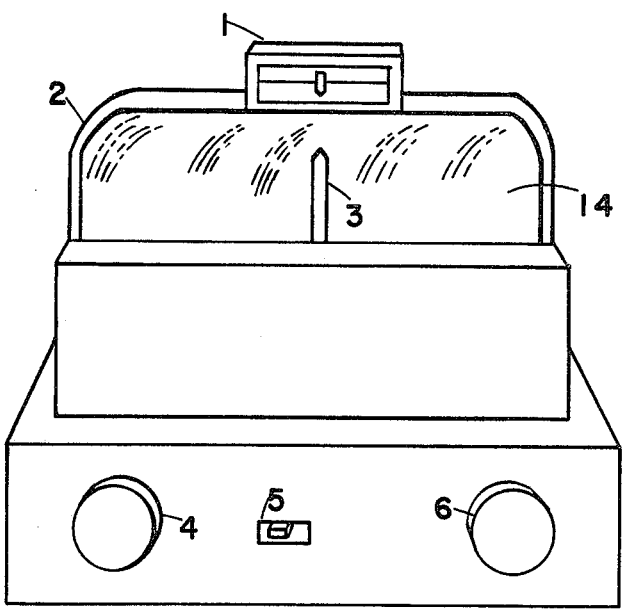
FIG. 1 is a perspective view showing an embodiment suitable for demonstrating psychokinetic effects.
Figure 2:
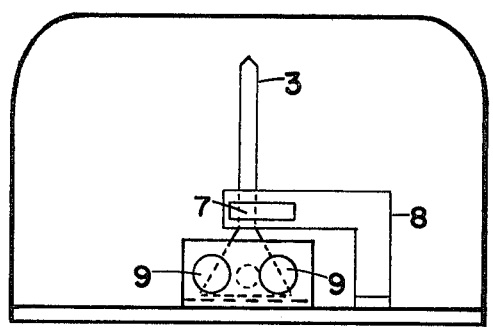
FIG. 2 is a view of the upper portion of the instrument with forward portion of case 2 removed to show input member, detectors and magnet.
Figure 3:
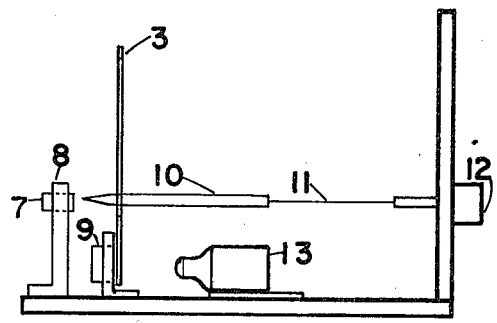
FIG. 3 is a side view of FIG. 2.
Figure 4:
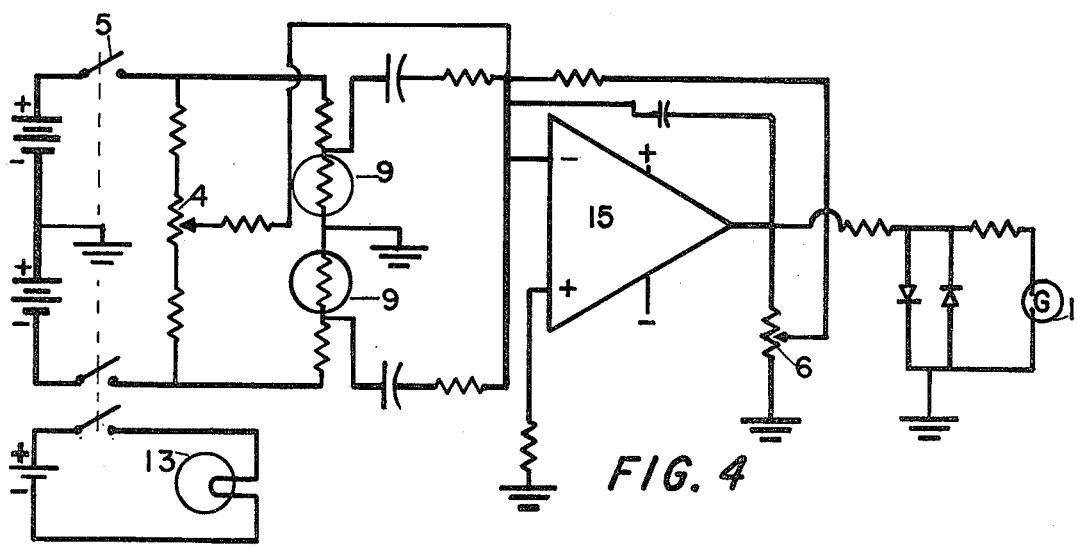
FIG. 4 is an electrical schematic showing relationship of detectors, amplifier and output indicator.
Figure 6:
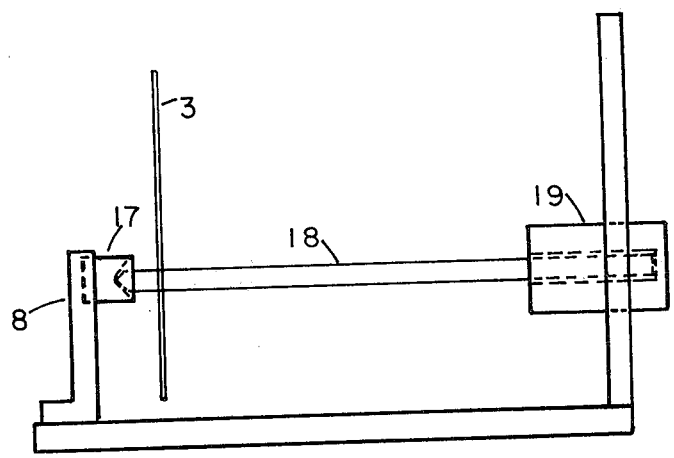
FIG. 6 shows the use of a jeweled cup-shaped bearing, collar and long shaft.
Figure 7:
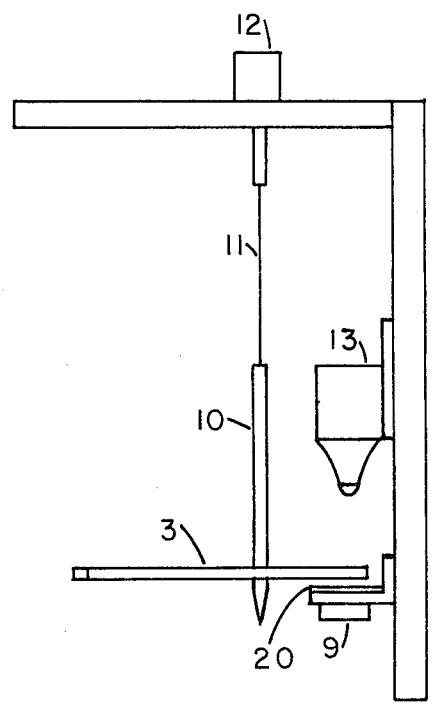
FIG. 7 shows the instrument rotated ninety degrees with input member shaft vertical to respond to gravity as the force field and indicating a color filter at the detectors.

FIG. 1 shows a basic embodiment in which 1 is the output indicator, 2 is the case, 3 the input member, 14 a window, 4 an electrical centering control, 5 on-off switch and 6 gain (amplification) control. In FIGS. 2 and 3 it can be seen how shaft 10 (a sewing needle in this case) carries input member 3, is constrained in horizontal motion by flexible means 11 (a thread) and is in close proximity to magnet 7. 12 is a mechanical centering device, adjustment of which permits an initial vertical placement of input member 3. 13 is an energy source (in this case a light bulb) and 9 is a pair of photo-cell detectors. 8 is the magnet support, and "G" in FIG. 4 stands for galvanometer. Various other ways are available to accomplish constraint of the horizontal motion of shaft 10. Instead of by flexible means, shaft 10 could be restrained by a thrust bearing. Such configuration would not then provide a restoring force and the instrument would be better suited to motion detection (of the input member) than for weighing objects. Another method consists of placing a small jewel at the magnet. See FIG. 6. The jewel 17 has a cup shaped recess to receive the point of long shaft 18. The rear end (opposite the point) of the shaft could then be restrained positionally by a collar 19 of (typically) "Teflon." The collar is supported by the case as is the centering device 12. All such methods of shaft constraint shall be referred to by the generic "shaft constraint." All methods of allowing rotational motion of the shaft shall be referred to by the generic "suitable bearing."

Operation is as follows: it can be seen that the lower end of the input member is shaped like a fish tail. In center or rest position it covers half of each detector in the pair 9. It thus casts a shadow on the detectors (due to its position between the detectors and the bulb 13). Magnet 7 is strong enough to cause the shaft 10 and input member 3 to float in the position shown. If the input member is caused by any external means to rotate, it will cover up more of one detector in the pair and less of the other.

Since the flexible means 11 will "wind up" due to such rotation, it provides a restoring force. The system of shaft 10, input member 3 and flexible means 11 make up a form of pendulum with some natural period dependent on mass and effective elasticity of the flexible means. (The flexible means need not in itself be elastic; however, since it is forced to wind up and since the pull of the magnet tends to unwind it when the input member is free, the system shows effective elasticity.) In operation, switch 5 (FIGS. 1 and 4) is closed, providing power to the operational amplifier 15 and bulb 13. The inverting input of the "op-Amp" is used as a summing junction. Summed are the inputs from the pair of photo cells 9, the centering adjustment 4 and a portion of the output from gain control 6. Since the DC polarities of the two photo-cells are opposite, their sum is zero when they are equal valued. Only a changing difference is coupled to the summing junction. (A.C. coupling is desirable, as it permits less critical zero adjustment of the output.) By feeding back less of the output (potentiometer 6 arm closer to ground), the gain is increased.

Figure 5:
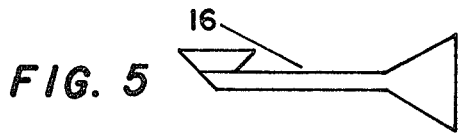
FIG. 5 depicts the input member horizontally and including a weighing pan.

A second embodiment wherein the device is used as an extremely sensitive weighing scale is described as follows. The same basic construction is used; FIG. 5 shows the input member (now 16) in a horizontal position and a weighing pan placed at its tip opposite the tail. All other elements remain in the same RELATIVE position with respect to the input member and for clarity are not shown. (FIG. 2 is simply rotated ninety degrees.) Now extremely small masses can be placed in the weighing pan. The restoring force (due to combination of flexible means-wind-up and magnet pull) determines the extent of rotation of the input member for a given mass. In this instance DC coupling must be used.

To prevent outside light from producing erroneous signals, window 14 is a color filter. A second filter 20 of different color is placed immediately in front (toward the energy source) of the detector. Red is most proper at the detector since it would permit a large portion of the lamp light to enter. If the window filter is green, ambient (outside) light is well attenuated before entering the detectors.

What I claim is:

1. An extremely sensitive force detector; comprising in combination a source of energy directed at a suitable detector for providing electrical output signals responsive to the received energy; a freely moveable input member shaped and positioned to partially obstruct said energy on its way to the detector; the position of the input member determining the degree of obstruction of said energy; a shaft carrying the input member is supported at its first end by a force field; attached to the opposite end of said shaft is a flexible means for the purpose of restraining the shaft in the force field; the opposite end of said flexible means is attached to a frame which supports all elements in this assemblage; a window is provided in the frame for the purpose of observing the input member; an amplifier is connected to the detector to increase the strength of the electrical signals provided by said detector; and said amplifier drives an output indicator for the purpose of ascertaining the degree of motion of the input member.

2. An extremely sensitive force detector as in claim 1 in which the input member contains a weighing pan and in use the assemblage is positioned so that the input member is horizontal so that the weighing pan may receive objects to be weighed.

3. An extremely sensitive force detector; comprising in combination a source of energy directed at a suitable detector for providing electrical output signals responsive to the received energy; a freely moveable input member shaped and positioned to partially obstruct said energy on its way to the detector; the position of the input member determining the degree of obstruction of said energy; a shaft carrying the input member is supported at one end by one end of a flexible means; the other end of said flexible means is attached to a frame which supports all elements of this assemblage; in use said frame is positioned so that the flexible means and the connected shaft are vertical so that the free end of the shaft is down, being attracted by the specific force field called gravity; a window is provided in the frame for the purpose of observing the input member; an amplifier is connected to the detector to increase the strength of the electrical signals provided by said detector; and said amplifier drives an output indicator for the purpose of ascertaining the degree of motion of the input member.

4. An extremely sensitive force detector; comprising in combination a source of energy which occupies that portion of the electro-magnetic spectrum commonly called light and which is directed at a suitable detector which is specifically a photocell; said detector is used for providing electrical output signals responsive to the received light energy; a freely moveable input member shaped and positioned to partially obstruct said energy on its way to the detector; the position of the input member determining the degree of obstruction of said energy; a shaft carrying the input member is supported at its first end by a force field; attached to the opposite end of said shaft is a flexible means for the purpose of restraining the shaft in the force field; the opposite end of said flexible means is attached to a frame which supports all elements in this assemblage; a window is provided in the frame for the purpose of observing the input member; said window is comprised of a color filter which transmits a relatively narrow portion of the frequency band of ambient light used for observation; a color filter of a different color than that of the window is placed at the light entrance part of the photocell for the purpose of attenuating the light used for observation; an amplifier is connected to the detector to increase the strength of electrical signals provided by said detector; and said amplifier drives an output indicator for the purpose of ascertaining the degree of motion of the input member.

5. An extremely sensitive force detector; comprising in combination a source of energy directed at a suitable detector for providing electrical output signals responsive to the received energy; a freely moveable input member shaped and positioned to partially obstruct said energy on its way to the detector; the position of the input member determining the degree of obstruction of said energy; a shaft carrying the input member is supported at its first end by a jewel with a cup shaped recess; the other end of the shaft being supported by a collar; the collar in turn is placed in a frame which supports all elements of this assemblage; a window is provided in the frame for the purpose of observing the input member; an amplifier is connected to the detector to increase the strength of the electrical signals provided by said detector; and said amplifier drives an output indicator for the purpose of ascertaining the degree of motion of the input member.

* * * * *